(12) United States Patent
Ostermann et al.

(10) Patent No.: US 7,603,828 B2
(45) Date of Patent: Oct. 20, 2009

(54) TRACK ADJUSTABLE MOUNTING ASSEMBLIES AND ASSOCIATED METHODS

(75) Inventors: Karl Ostermann, Erie, PA (US); Larry Ellis, Cattaraugus, NY (US); Chris Oyer, Randolph, NY (US)

(73) Assignee: Alcoa Closure Systems International, Inc., Crawfordsville, IN (US)

( * ) Notice: Subject to any disclaimer, the term of this patent is extended or adjusted under 35 U.S.C. 154(b) by 0 days.

(21) Appl. No.: 11/411,741

(22) Filed: Apr. 26, 2006

(65) Prior Publication Data

US 2007/0251195 A1 Nov. 1, 2007

(51) Int. Cl.
*B65B 7/28* (2006.01)
*F16H 53/06* (2006.01)

(52) U.S. Cl. .............. 53/329; 53/331; 53/485; 53/490; 74/569

(58) Field of Classification Search .......... 53/484, 53/485, 490, 201, 329, 331, 331.5; 74/567–569
See application file for complete search history.

(56) References Cited

U.S. PATENT DOCUMENTS

| 3,852,941 A | * | 12/1974 | Bross | 53/317 |
|---|---|---|---|---|
| 4,075,820 A | * | 2/1978 | Standley | 53/329.4 |
| 4,099,361 A | * | 7/1978 | Dix et al. | 53/488 |
| 4,299,072 A | * | 11/1981 | Holstein | 53/306 |
| 4,559,759 A | * | 12/1985 | Herbert | 53/308 |
| 5,121,587 A | * | 6/1992 | Zanini et al. | 53/367 |
| 5,419,094 A | * | 5/1995 | Vander Bush et al. | 53/75 |
| 5,528,879 A | * | 6/1996 | Louy et al. | 53/201 |
| 6,115,992 A | * | 9/2000 | Bankuty et al. | 53/308 |
| 6,158,196 A | * | 12/2000 | Trebbi et al. | 53/331.5 |
| 6,293,003 B1 | * | 9/2001 | Sakurai et al. | 29/740 |
| 6,662,526 B2 | * | 12/2003 | Riggs et al. | 53/308 |
| 6,679,026 B1 | * | 1/2004 | Cirio | 53/317 |
| 7,497,145 B2 | * | 3/2009 | El Hachem et al. | 74/569 |
| 2004/0226261 A1 | * | 11/2004 | Graffin | 53/75 |

* cited by examiner

*Primary Examiner*—Rinaldi I. Rada
*Assistant Examiner*—Gloria R. Weeks
(74) *Attorney, Agent, or Firm*—Wood, Phillips, Katz, Clark & Mortimer

(57) ABSTRACT

The present invention provides a novel cam-actuated spindle assembly for selectively attaching a cam follower to a capping spindle. By adjusting the assembly, the user can easily adjust a capping spindle to follow a selected one of different tracks that are formed into a barrel cam. This simplifies the process of adjusting a bottle capping or corking machine to accommodate a variety of products with different types and sizes of closures and bottles. The mounting assembly weighs considerably less than a spindle or barrel cam, and therefore, is considerably easier to reposition and adjust. There is no need to remove the barrel cam or change out the spindle, which significantly reduces costs, down-time, and manpower requirements. The mounting assembly is designed to be compatible with existing bottle capping equipment.

9 Claims, 5 Drawing Sheets

TRACK ADJUSTABLE MOUNTING ASSEMBLIES AND ASSOCIATED METHODS

FIELD OF THE INVENTION

The present invention relates to mounting assemblies that simplify the process of adjusting a spindle to move along different barrel cam tracks, and more particularly to an adjustable cam-actuated spindle assembly for a capping machine, which includes an adjustably mounted cam follower to permit the assembly to be selectively configured for operation by a selected one of two or more cam tracks of an associated barrel cam.

BACKGROUND INFORMATION

Bottle capping machines utilize spindles that progress through a series of motions to systematically pick up caps, corks, or other closures, and apply them to bottles. Bottle capping machines can be used to apply a variety of closures, including but not limited to screw-on, snap-on, or roll-on caps, and corks made from natural or synthetic materials. Bottles can be made from any suitable material including but not limited to glass, plastic aluminum, or the like.

The motions of the capping spindle are effected by a stationary barrel cam that defines a cam track or groove for dictating the vertical path in which the spindle will move as it revolves about the cam. For proper application of bottle closures, the barrel cam track, which dictates the vertical motion of the spindle, must be matched to the thread pitch and exterior geometry of the cap being applied. The barrel cam is designed to work with a specific thread finish (e.g., single, double, triple lead, corker, snap-on, or roll on), which limits the variety of products that may be capped on any given machine. Changing a barrel cam on a capping machine is time-consuming, often requiring a full day's down-time, and the work must be performed by skilled technicians.

Several techniques have been developed for changing the barrel cam on a bottle capping machine to accommodate different types of products. The first technique utilizes a split barrel cam that can be unbolted and replaced with another barrel cam having a different track. However, removal of the split barrel cam requires the removal of all capping spindles, a crew of skilled technicians, and considerable down-time. The second technique utilizes a separate servomotor connected to each spindle with programmable logic controls (PLC) that allow a spindle to vary its path using software. A barrel cam and cam follower are not required. However, from a controls perspective, this is a complex solution that requires maintenance skills beyond those of the typical bottling industry staff. It is also a relatively costly solution.

A third technique utilizes a barrel cam with dual tracks and two unique spindle assemblies for use with each track. To adjust the barrel cam track, one of the spindle assemblies is removed from the machine and the other spindle assembly is installed. With this technique, a change-over can be accomplished more quickly, however, the technique requires significantly more money in start-up and operation and maintenance costs since two sets of spindle assemblies (and possibly headsets) are involved.

A fourth technique utilizes an independent headset drive (IHD) arrangement that allows the spindle revolutions to be decoupled from the capping turret revolutions using a servomotor and idler gears. Compared to standard capping techniques, the fourth technique requires drivetrain and controls that are costly and complicated. To avoid damaging the cap during application, control can be maintained by adjusting the rpm to a much higher or lower value than is normally possible. However, the fourth technique tends to address symptoms of the problem rather than providing a true solution because the rotational speed of the spindle is used to compensate for a compromised cam profile.

Thus, there exists a need for a barrel cam and spindle assembly that can accommodate multiple products without requiring significant cost down-time technical expertise, and maintenance. The assembly should allow the spindle to be operated by a selected one of multiple tracks on a barrel cam with relatively little effort. Ideally the assembly would mitigate the need to change the barrel cam and spindle, and would not require the use of any parts other than those already contained on the spindle.

SUMMARY OF THE INVENTION

In accordance with the present invention, a cam-actuated spindle assembly for a capping machine is disclosed which facilitates convenient adjustment of the assembly so that it can be actuated by a selected one of two or more cam tracks defined by an associated barrel cam. The assembly includes an adjustable mounting arrangement which facilitates selective positioning of a cam follower with respect to the capping spindle, whereby the assembly can be readily adjusted for operation by the selected one of the barrel cam tracks. The adjustable spindle assembly thus facilitates efficient conversion of the associated capping machine for applying closures which require differing spindle motions for application to associated containers.

The present invention provides novel mounting assemblies and associated methods for attaching a cam follower to a capping spindle. By adjusting the mounting assembly, the user can easily adjust a capping spindle to follow different tracks that are formed into a barrel cam. The mounting assembly includes a plurality of passageways or openings that are positioned on the yoke of the spindle. A removable mounting plate is detachably mounted on the yoke and includes a mounting portion on which a cam follower can be mounted, and a positioning portion. In the illustrated embodiment, the positioning portion is provided in the form of a positioning boss or alignment extension, and the mounting portion is provided in the form of a cam follower extension.

When the removable plate is secured to the yoke the extensions fit within the passageways. A cam follower is connected to the cam follower extension, and the "track end" of the cam follower engages a barrel cam track when the removable plate is secured to the yoke. As the spindle moves around the barrel cam, the cam follower moves along the track causing the spindle to move in a vertical path. To change the spindle for operation by a different track on the barrel cam, the user may detach the removable plate and reattach it to the yoke in a different position. e.g. by inverting the plate or moving it up or down. When the removable plate is secured back onto the yoke, the cam follower extension will be positioned within a different passageway, with the positioning portion rigidifying the connection by disposition in the other one of the passageways. The new positioning allows the track end of the cam follower to move along a different barrel cam track, directing the spindle to move along a different vertical path.

Thus, the adjustable mounting arrangement of the present spindle assembly, including the adjustably positionable mounting plate, facilitates operation of the spindle by a selected one of two different cam profiles defined by the associated barrel cam by positioning the cam follower of the assembly in a selected one of first and second positions. In the preferred form, the mounting portion of the mounting plate on which the cam follower is mounted is configured like the positioning boss of the mounting plate, so that when the positioning boss is received in one of the first and second openings or passageways defined by the spindle, the mounting portion is received in the other one of the opening or passageways.

By this arrangement, the mounting plate is mounted on the associated spindle by accurate physical geometry, thus permitting the mounting plate to be properly positioned in a highly repeatable manner, with little mechanical skill required for its adjustment. Essentially, adjustment can be effected by removal of the mounting plate and its simple inversion, whereby the cam follower is moved from generally within one of the openings defined by the spindle, and positioned in the other, while the positioning boss of the mounting plate is similarly repositioned from one of the openings to the other.

It is an aspect of the present invention to provide a mounting assembly for attaching a cam follower to a capping spindle such that a capping spindle can follow a barrel cam track, the mounting assembly comprising: a yoke that is attached to said capping spindle, wherein the yoke has a plurality of passageways: a removable plate that is detachably mounted on the yoke; at least one alignment extension and at least one cam follower extension that are mounted on the removable plate, wherein the extensions are structured and arranged to slidably fit within the passageways of the yoke; and a cam follower that is connected to the cam follower extension, wherein the cam follower has a track end that engages a barrel cam track when the alignment extension and the cam follower extension are positioned within the passageways of the yoke and the removable plate is mounted on the yoke.

It is another aspect of the present invention to provide a barrel cam assembly for a bottle capping machine, the assembly comprising: a barrel cam having a plurality of tracks; a capping spindle; a yoke that is attached to the capping spindle, wherein the yoke has a plurality of passageways; a removable plate that is detachably mounted on the yoke; at least one alignment extension and at least one cam follower extension mounted on the removable plate, wherein the extensions are structured and arranged to slidably fit within the passageways of the yoke; and a cam follower that is connected to the cam follower extension wherein the cam follower has a track end that engages a barrel cam track when the alignment extension and the cam follower extension are positioned within the passageways of the yoke and the removable plate is mounted on the yoke.

It is a further aspect of the present invention to provide a method of adjusting a capping spindle to follow a different barrel cam track wherein the capping spindle is attached to a yoke having a plurality of passageways a removable plate is detachably mounted on the yoke, at least one alignment extension is mounted on the removable plate and slidably movable within a first passageway of the yoke, at least one cam follower extension is mounted on the removable plate and slidably movable within a second passageway of the yoke, and a cam follower is connected to the cam follower extension, wherein the cam follower has a track end that engages an initial barrel cam track, the method comprising: detaching the removable plate from the yoke; repositioning the removable plate so that the at least one alignment extension and the at least one cam follower extension are aligned with different passageways in the yoke; and reattaching the removable plate to the yoke such that the track end of the cam follower engages a different barrel cam track.

It is an object of the present invention to provide a barrel cam and spindle assembly that can accommodate a variety of products having different types of closures and bottles.

It is another object of the present invention to provide a barrel cam and spindle assembly that can accommodate a variety of products without requiring significant cost, downtime, technical expertise, or maintenance.

It is a further object of the present invention to provide a barrel cam and spindle assembly that allows the spindle to alternate between multiple tracks on a barrel cam with relatively little effort.

It is another object of the present invention to provide a barrel cam and spindle assembly that would mitigate the need to completely change the barrel cam and spindle.

It is a further object of the present invention to provide a barrel cam and spindle assembly that would not require the use of any parts other than those already contained on the spindle.

These and other objects of the present invention will become more readily apparent from the following detailed description and appended claims.

DETAILED DESCRIPTION OF THE PREFERRED EMBODIMENTS

Figure 1:
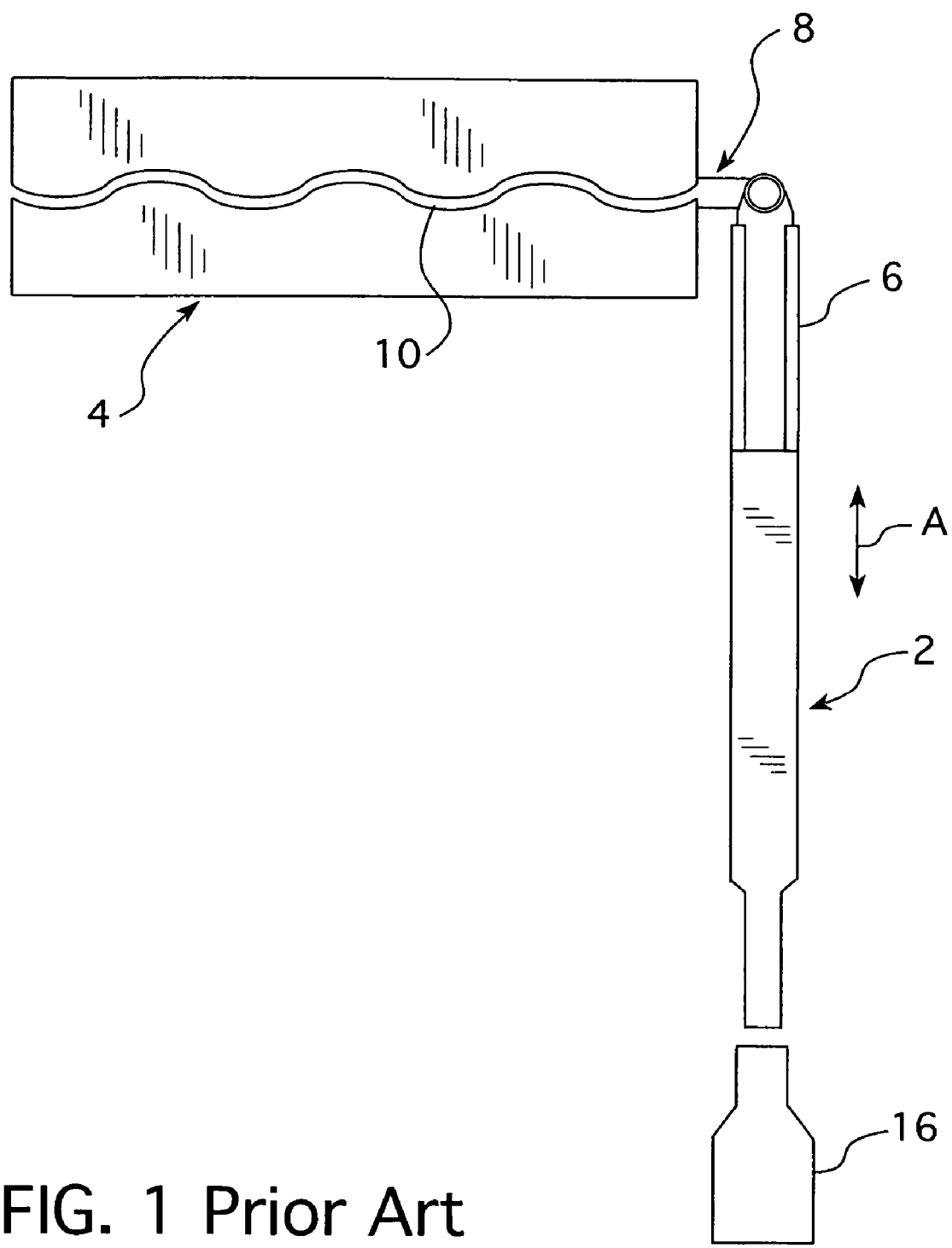
FIG. 1 is a schematic elevational view of a prior art barrel cam and spindle assembly.

While the present invention is susceptible to embodiment in various form, there is shown in the drawings and will hereinafter be described, a presently preferred embodiment, with the understanding that the present disclosure is to be considered as an exemplification of the invention, and is not intended to limit the invention to the specific embodiment illustrated.

The present invention simplifies the process of adjusting a bottle capping machine to accommodate a variety of products with different types of closures and bottles. Suitable closures may include, but are not limited to, screw-on, snap-on, or roll-on caps, and natural or synthetic corks. Bottles can be made from glass, plastic, aluminum, or the like. The invention includes a mounting plate with a light-weight removable plate that is repositioned to adjust the barrel cam track that a cam follower is following. The removable plate weighs considerably less than a spindle or barrel cam, and therefore, is considerably easier to remove, reposition, and reattach. There is no need to remove the barrel cam or change out the spindle, which significantly reduces costs, down-time, and manpower requirements. The mounting assembly can be designed for compatibility with existing bottle capping equipment.

FIG. 1 shows a schematic elevational view of a standard spindle 2 and barrel cam 4 for use with a bottle capping or corking machine. The spindle 2 is connected to a yoke 6, which includes a cam follower 8 for engaging a track 10 that is formed into the barrel cam 4. As the spindle 2 moves around the barrel cam 4, the cam follower 8 moves along the track 10, causing the spindle 2 to move up and down, as indicated by the letter A in FIG. 1, in a pathway that is dictated by the track 10. The motion of the spindle 2 allows it to apply a closure to a bottle 16.

Figure 2:
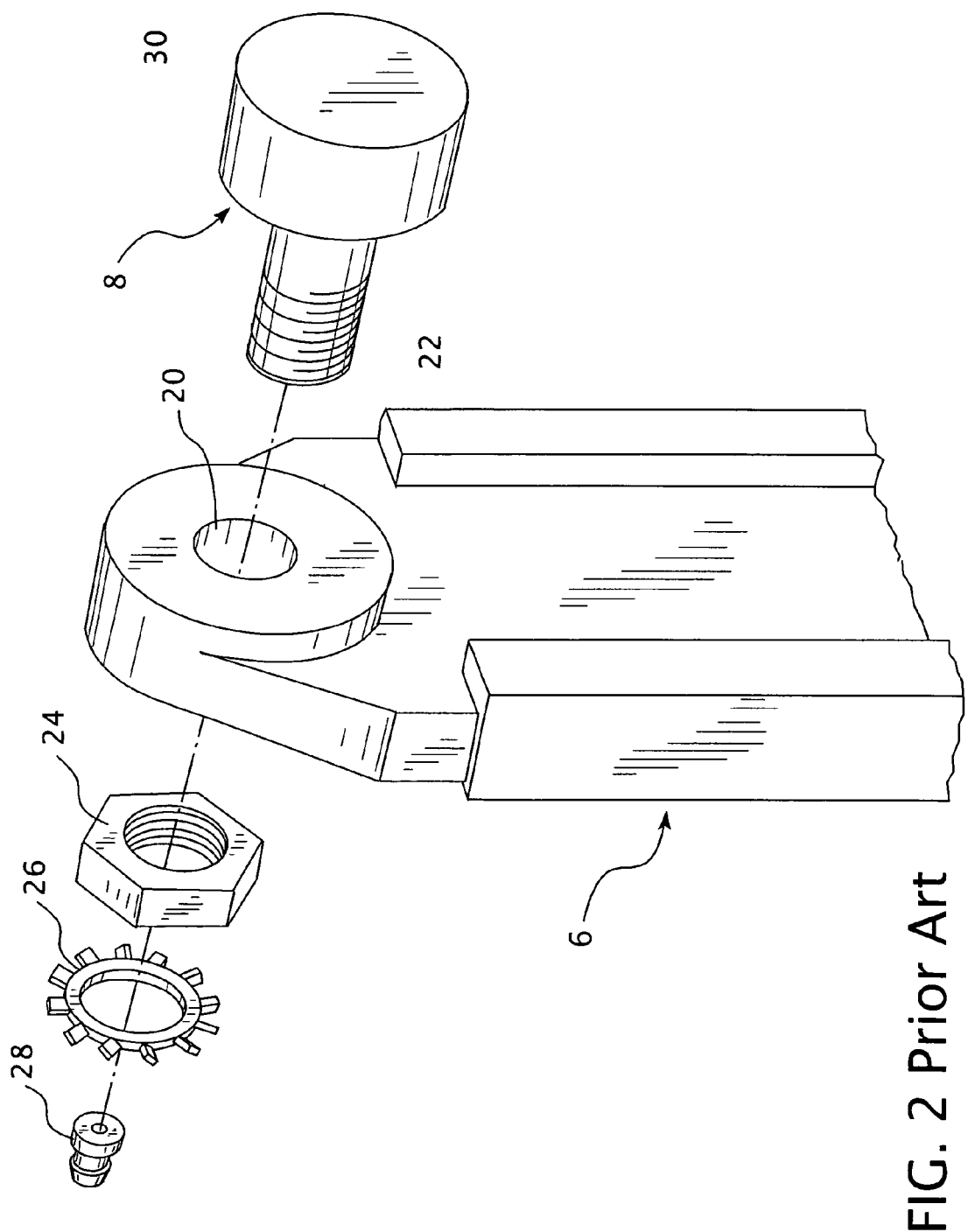
FIG. 2 is an exploded perspective view of a prior art yoke and cam follower.

FIG. 2 shows an exploded perspective view of the yoke 6 and cam follower 8 for a standard barrel cam and spindle assembly. The yoke 6 includes a single passageway 20 for allowing a threaded end 22 of the cam follower 8 to pass through, thereby engaging the cam follower 8. The cam follower 8 is detachably mounted onto the yoke 6 by tightening a nut 24. a washer 26, and a lubrication fitting 28 onto the threaded end 22 of the cam follower 8 when the threaded end 22 has been positioned to pass through the passageway 20. The "track end" 30 of the cam follower 8 engages a track that is formed into a barrel cam (not shown).

Figure 3:
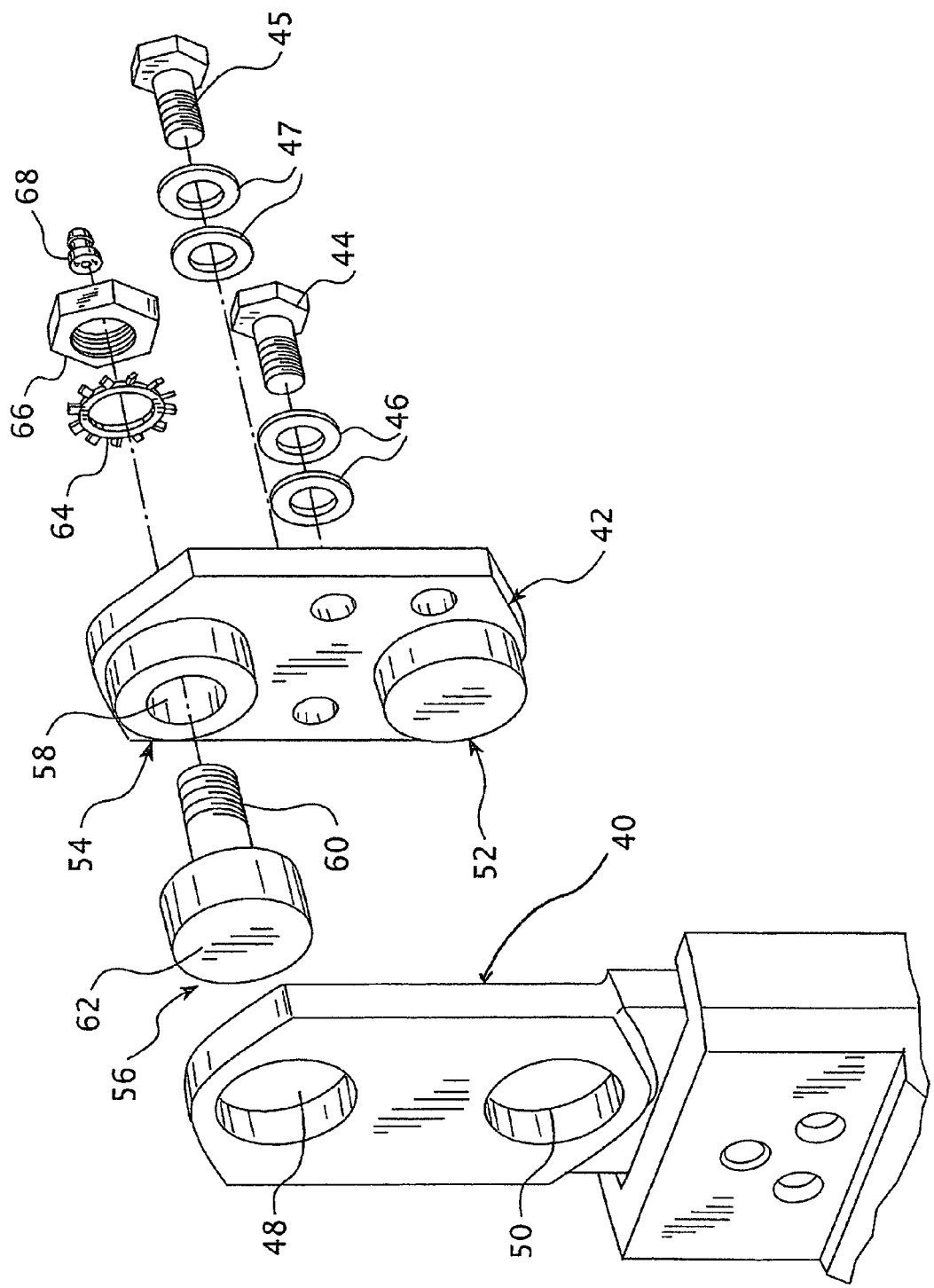
FIG. 3 is an exploded perspective view of a mounting assembly in accordance with a preferred embodiment of the present invention.

FIG. 3 shows an exploded perspective view of an adjustable, cam-actuated spindle assembly in accordance with a preferred embodiment of the present invention. The spindle assembly comprises the yoke 40 of a spindle and a removable mounting plate 42 that is detachably mounted on the yoke 40. The removable plate 42 can be detachably mounted using any suitable means, for example, the bolts 44, 45 and washers 46. 47 that are depicted in FIG. 3. The yoke 40 defines a plurality of passageways or openings, e.g., openings 48, 50, which can be located at any position along the yoke 40, but preferably generally proximate the upper end thereof. While the description contained herein primarily refers to the use of a yoke 40 having two passageways 48, 50, it is understood that the present invention contemplates the use of a yoke having more than two passageways as well. The invention is not limited to any particular number of particular number of passageways or positioning of passageways along the yoke. Furthermore, the passageways can have any size or shape desired, including circular or non-circular shapes. In a preferred embodiment, the passageways are holes having substantially equal dimensions. In addition, the removable plate 42 can have any size. shape, or configuration desired. The yoke 40 may be designed with surface features. e.g., a cut-out area, grooves. or extensions, that are compatible with, or assist in engaging or receiving, the removable plate 42.

The removable mounting plate 42 is provided with at least one positioning portion, which in the illustrated embodiment, is provided in the form of a positioning boss or alignment extension 52, and at least one mounting portion in the form of mounting boss or cam follower extension 54, bosses/extensions are screwed or otherwise mounted and secured onto the removable plate 42, or integrally formed therewith.

While the description contained herein primarily refers to the use of one alignment extension 52 and one cam follower extension 54, it is understood that any number of alignment and/or cam follower extensions may be connected to the removable plate 42. Furthermore, the outer peripheral shape of the extensions can have any suitable size, shape, or design, including circular or non-circular shapes.

In a preferred embodiment, the extensions have substantially equal dimensions. Similarly, the openings 48, 50 defined by the yoke of the associated spindle are also similarly configured, and preferably provided with substantially equal dimensions, with the dimensions of the openings 48, 50 (i.e., the inside diameters), corresponding to the dimensions (i.e., the outside diameters) of the positioning boss 52 and mounting boss 54. By this arrangement, either one of the bosses can be securely and positively positioned within either one of the openings 48, 50, with the other one of the bosses received in the other one of the openings.

The alignment extension 52 (i.e., the positioning boss) and the cam follower extension 54 (i.e., the mounting boss) are structured and arranged to slidably fit within the passageways 48, 50 of the yoke 40 when the removable plate 42 is attached to the yoke 40. The purpose of the cam follower extension 54 is to hold a cam follower 56 in place so that it can engage or slide along a selected track in a barrel cam (not shown in this view). The cam follower extension 54 may include a bore 58 for receiving the threaded end 60 of a cam follower 56. A suitable lock washer 64 and nut 66 may be used to fasten the threaded end 60 of the cam follower 56 within the threaded bore 58. The cam follower 56 is thus preferably detachably connected to the cam follower extension 54, to facilitate periodic replacement as may be required. Lubrication fitting 68 can be provided to facilitate lubrication of the follower. The purpose of the alignment extension 52 is to engage the passageway 50 of the yoke 40 that is not being engaged by the cam follower extension 54. This acts to ensure proper positioning of the removable plate 42 with respect to the yoke 40 and the proper positioning of the cam follower 56 and its track end 62 with respect to the barrel cam track. It is preferable for the alignment extension 52 and cam follower extension 54 to fit within the passageways 48, 50 of the yoke 40, but not to extend beyond the yoke 40, or to only extend slightly beyond the yoke 40.

When the cam follower 56 is attached to the cam follower extension 54 and the removable plate 42 is secured to the yoke 40, the track end 62 of the cam follower 56 will extend beyond the yoke 40 to engage a barrel cam track. The cam follower 56 and its track end 62 are preferably designed to slidably pass through the passageways 48, 50 of the yoke 40.

To change the spindle for operation by a different track on the barrel cam, the user may detach the removable plate 42 and reattach it to the yoke 40 in a different position. This may be accomplished by inverting the removable plate 42 so that the alignment extension 52 and/or cam follower extension 54 engage a different one of the openings/passageways 48, 50 in the yoke 40. When the removable plate 42 is secured back onto the yoke 40, the new positioning allows the track end 62 of the cam follower 56 to move along a different barrel cam track, causing the spindle to move along a different vertical path.

Figure 4:
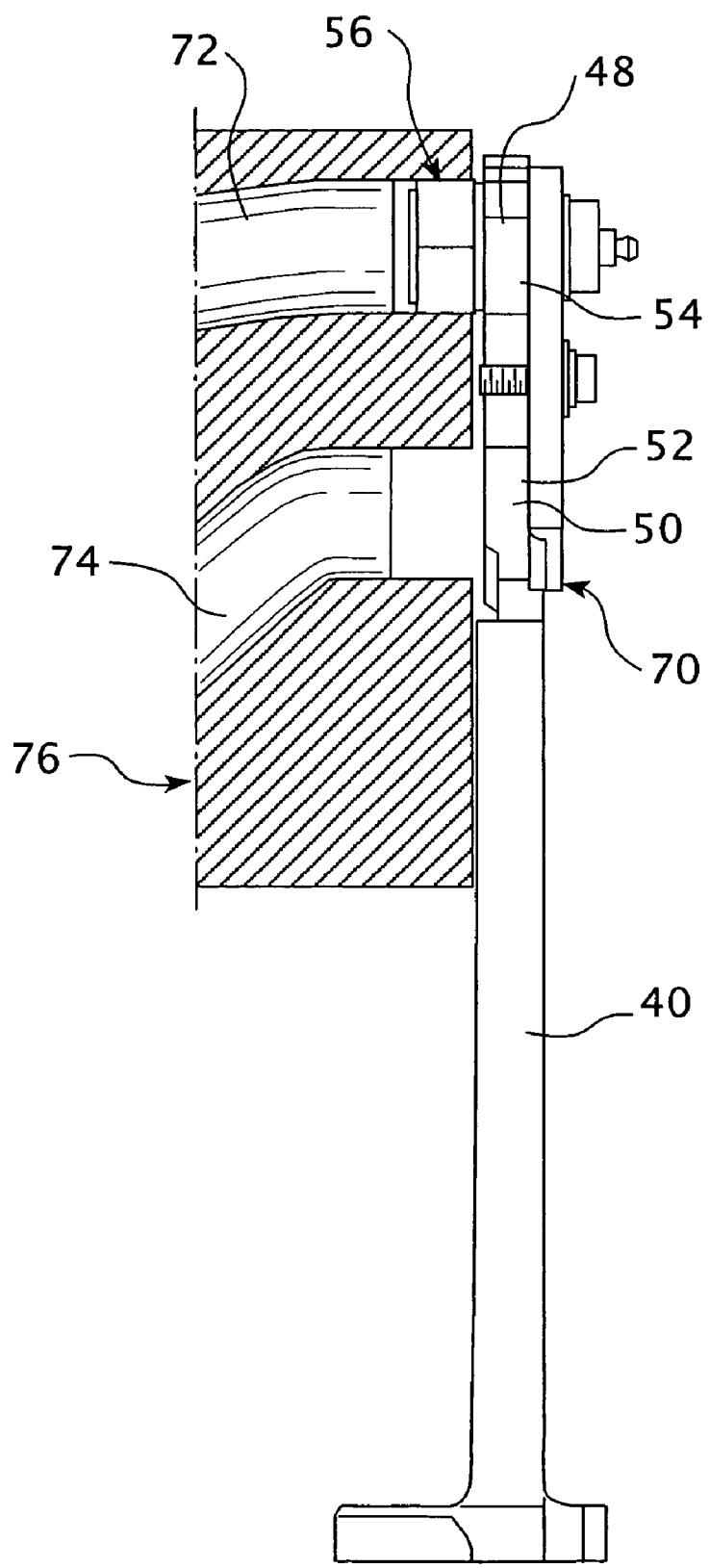
FIG. 4 is a schematic elevational view of a mounting assembly that has been positioned to engage the upper track of a barrel cam in accordance with an embodiment of the present invention.

FIG. 4 shows a schematic elevational view of a mounting assembly 70 of the present invention where it is fully assembled and positioned to engage one of two tracks 72, 74 that are formed into a barrel cam 76, in this case, the upper track 72. FIG. 4 does not show the entire barrel cam 76, only a small portion that is located closest to the mounting assembly 70. In FIG. 4, the cam follower extension 54 is positioned within the upper passageway 48 of the yoke 40, and the alignment extension 52 is positioned within the lower passageway 50 of the yoke 40. The cam follower 56 is connected to the cam follower extension 54 and engages the upper track 72 of the barrel cam 76.

Figure 5:
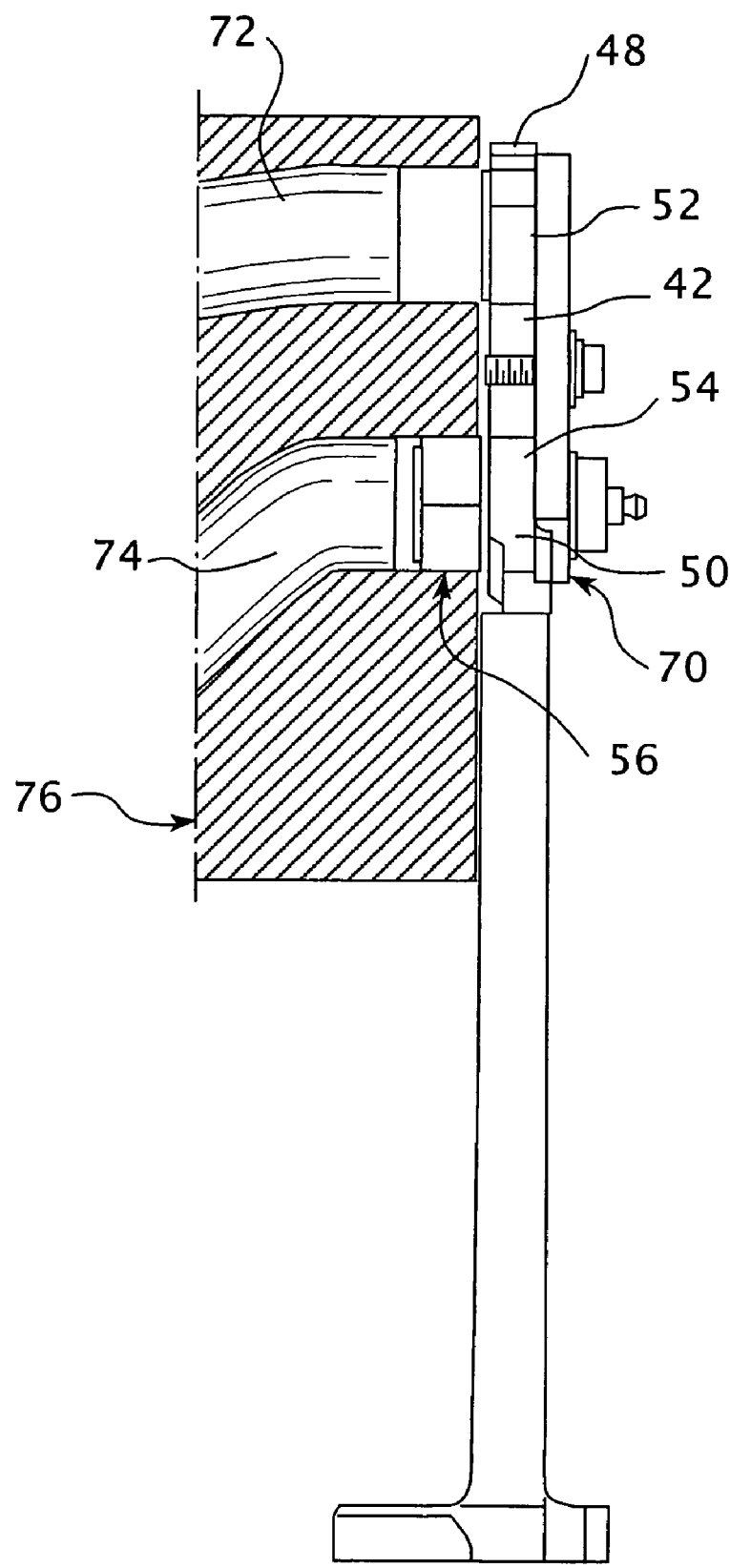
FIG. 5 is a schematic elevational view of a mounting assembly that has been positioned to engage the lower track of a barrel cam in accordance with an embodiment of the present invention.

FIG. 5 shows a schematic elevational view of mounting assembly 70 where it is fully assembled and positioned to engage the lower track 74 that is formed into a barrel cam 76. Compared to FIG. 4, the removable plate 42 shown in FIG. 5 has been repositioned or adjusted so that the alignment extension 52 and cam follower extension 54 are positioned in different ones of the openings/passageways 48, 50 in the spindle yoke. The cam follower extension 54 is positioned in the lower passageway 50 of the yoke 40, and the alignment extension 52 is positioned in the upper passageway 48 of the yoke 40. The cam follower 56 is connected to the cam follower extension 54 and engages the lower track 74 of the barrel cam 76.

While the description contained herein primarily refers to the use of a barrel cam having two tracks, it is understood that the present invention contemplates the use of a barrel cam having more than two tracks as well. Although the present invention is not limited to any particular number of openings/passageways in the yoke, the total number of passageways preferably corresponds with the number of tracks that are formed into the barrel cam. The number of extensions on the removable plate may or may not correspond to the number of passageways in the yoke. In a preferred embodiment, a removable plate having one alignment extension and one cam follower extension (a total of two extensions) may be used for a barrel cam having two or more tracks.

The present invention contemplates not only novel mounting assemblies, but also barrel cam assemblies for bottle capping and corking machines that include the novel mounting assemblies.

From the foregoing, it will be observed that numerous modifications and variations can be effected without departing from the true spirit and scope of the novel concept of the present invention. It is to be understood that no limitation with respect to the specific embodiment illustrated herein is intended or should be inferred. The disclosure is intended to cover, by the appended claims, all such modifications as fall within the scope of the claims.

What is claimed is:

1. A cam-actuated spindle assembly for a capping machine, comprising:
    a barrel cam having a plurality of cam tracks;
    a capping spindle defining a spindle axis along which said spindle is vertically movable, said capping spindle defining first and second vertically spaced openings;
    a cam follower; and
    an adjustable mounting arrangement for mounting said cam follower on said spindle in a selected one of vertically spaced first and second positions on said spindle to facilitate vertical actuation of said spindle assembly by a selected one of two different cam profiles,
    said mounting arrangement including a single mounting plate having a mounting portion on which said cam follower is mounted on a follower axis perpendicular to said spindle axis, said mounting plate being configured for attachment to said capping spindle in a selected one of first and second, relatively inverted positions to position said cam follower in the selected one of said vertically spaced first and second positions for respective engagement of said cam follower with a selected one of said cam tracks of said barrel cam,
    said mounting plate includes a positioning portion, spaced from said mounting portion and engageable with said spindle in each of said first and second positions of said mounting plate by disposition of said positioning portion in a selected one of said first and second openings defined by said capping spindle, and disposition of said mounting portion in the other one of said first and second openings.

2. A cam-actuated spindle assembly in accordance with claim 1, wherein:
    said positioning portion comprises a positioning boss projecting from said mounting plate.

3. A cam-actuated spindle assembly in accordance with claim 2, wherein:
    said mounting portion of said mounting plate is configured like said positioning boss of said mounting plate.

4. A cam-actuated spindle assembly in accordance with claim 3, wherein:
    said cam follower and said mounting portion together extend generally through one of said openings when said mounting plate is attached to said capping spindle.

5. A cam-actuated spindle assembly in accordance with claim 1, including: a barrel cam defining two said different cam profiles.

6. A barrel cam assembly for a bottle capping machine, the assembly comprising:
    a barrel cam having a plurality of tracks;
    a capping spindle defining an axis along which said spindle is vertically movable;
    a yoke that is attached to the capping spindle, wherein the yoke has a plurality of cylindrical passageways;
    a single, removable plate that is detachably mounted on the yoke in a selected one of first and second positions by invertibly repositioning said removable plate;
    at least one cylindrical alignment extension and at least one cylindrical cam follower extension mounted on the removable plate, wherein the extensions are spaced from each other and are structured and arranged to slidably fit within the passageways of the yoke; and
    a cam follower that is connected to the cam follower extension on a follower axis perpendicular to said spindle axis, wherein the cam follower has a track end that engages a selected one of said plurality of barrel cam tracks when the alignment extension and the cam follower extension are respectively positioned within the passageways of the yoke and the removable plate is mounted on the yoke in a first position, and wherein the track end of the cam follower engages another one of the barrel cam tracks when the alignment extension and the cam follower extension are in an inverted respective position within said passageways and the removable plate is mounted on the yoke in a second position.

7. The barrel cam assembly of claim 6, wherein:
    the cam follower is detachably connected to the at least one cam follower extension.

8. The barrel cam assembly of claim 6, wherein:
    the passageways of the yoke have substantially equal dimensions.

9. The barrel cam assembly of claim 6, wherein:
    the at least one alignment extension and the at least one cam follower extension have substantially equal dimensions.

* * * * *